United States Patent
Nishida

(10) Patent No.: US 9,891,872 B2
(45) Date of Patent: Feb. 13, 2018

(54) PRINTER DRIVER PROGRAM INSTALLED ON BOTH TERMINAL AND SERVER

(71) Applicant: Konica Minolta, Inc., Tokyo (JP)

(72) Inventor: Masanori Nishida, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/053,667

(22) Filed: Feb. 25, 2016

(65) Prior Publication Data

US 2016/0253132 A1   Sep. 1, 2016

(30) Foreign Application Priority Data

Feb. 27, 2015   (JP) ................................ 2015-039001

(51) Int. Cl.
| | | |
|---|---|---|
| *H04N 1/04* | (2006.01) | |
| *G06F 3/12* | (2006.01) | |
| *G06F 9/445* | (2006.01) | |
| *G06F 9/44* | (2006.01) | |
| *H04N 1/00* | (2006.01) | |

(52) U.S. Cl.
CPC .......... *G06F 3/1225* (2013.01); *G06F 3/1203* (2013.01); *G06F 3/1204* (2013.01); *G06F 3/1286* (2013.01); *G06F 8/61* (2013.01); *G06F 9/4411* (2013.01); *H04N 1/00973* (2013.01)

(58) Field of Classification Search
CPC .... G06F 3/1225; G06F 3/1203; G06F 3/1204; G06F 3/1286
USPC .......................................... 358/1.15, 1.14, 1.9
See application file for complete search history.

(56) References Cited

U.S. PATENT DOCUMENTS

| | | | | |
|---|---|---|---|---|
| 6,113,208 A | * | 9/2000 | Benjamin | B41J 2/17546 347/7 |
| 2006/0072140 A1 | * | 4/2006 | Mitani | G06F 3/1205 358/1.13 |
| 2012/0200877 A1 | * | 8/2012 | Kanamori | G06F 3/1206 358/1.13 |

FOREIGN PATENT DOCUMENTS

| | | |
|---|---|---|
| JP | 2010-257219 A | 11/2010 |
| JP | 2013/239066 A | 11/2013 |
| JP | 2013-239086 A | 11/2013 |

OTHER PUBLICATIONS

Office Action issued in corresponding Japanese Application No. 2015-039001 dated Apr. 18, 2017, and English translation thereof (6 pages).

* cited by examiner

*Primary Examiner* — Houshang Safaipour
(74) *Attorney, Agent, or Firm* — Osha Liang LLP

(57) ABSTRACT

A printer driver is installed on a client PC. The printer driver acquires a first time stamp from a server, and determines whether the first time stamp and a second time stamp stored in the client PC are identical. When the first time stamp and the second time stamp are different, the printer driver acquires device option information of a MFP. When the first time stamp and the second time stamp are different, the printer driver updates content of the second time stamp to content of the first time stamp.

11 Claims, 14 Drawing Sheets

PRINTER DRIVER PROGRAM INSTALLED ON BOTH TERMINAL AND SERVER

CROSS-REFERENCE TO RELATED APPLICATIONS

This application is based on Japanese Patent Application No. 2015-039001 filed with the Japan Patent Office on Feb. 27, 2015, the entire content of which is hereby incorporated by reference.

BACKGROUND OF THE INVENTION

Field of the Invention

This invention relates to a printer driver program. More specifically, this invention relates to a printer driver program which is installed on both a terminal and a server.

Description of the Related Art

Windows (a registered trademark) being a typical OS (Operating System) for PCs (Personal Computers) has a function of Point and Print. Point and Print is a function to install a printer driver of an image forming apparatus on user's client PC, by downloading the printer driver from a server (a printer server) to the client PC. The printer driver of the image forming apparatus is beforehand installed on the server. A printer driver used for the Point and Print is different from a printer driver installed locally on a PC, since the same printer drivers used for the Point and Print are installed on both a client PC and a server.

When a user instructs a client PC to install a printer driver on the client PC by using Point and Print, the client PC downloads a program of the printer driver and device option information of the image forming apparatus from a server. The client PC performs printing, by using the downloaded printer driver on the image forming apparatus, in accordance with instructions of the user.

The printer driver installed on the server and the printer driver installed on the client PC are the same modules, and synchronized at required timings.

The Document 1 below discloses techniques related to a printer driver, for example. In the Document 1 below, a PC is equipped with a print command acquire unit, a display command acquire unit, a screen display unit for each of functions, a setting value receiving unit, and a command generate unit.

The print command acquire unit acquires one or more print commands which correspond to one or more setting values which can be set for a function, for each of a plurality of functions which a MFP (Multifunction Peripheral) has. The display command acquire unit acquires display commands for displaying screens for each of functions in which setting values are set for the function, for each of functions. The screen display unit for each of functions generates and displays screens for the functions, in accordance with the acquired display command. The setting value receiving unit receives setting values being input by a user. The command generate unit generates print commands for performing the function on the MFP, by selecting a print command which corresponds to the received setting values, among one or more print commands.

[Document 1] Japan Patent Publication No. 2013-239086

By using a universal printer driver, a plurality of models of image forming apparatuses can be used by a single printer driver. It is assumed that a universal printer driver is used in an image forming system in which a server, a plurality of client PCs, and a plurality of image forming apparatuses are connected with a network. Point and Print shall be able to be used between a print server and the client PCs, in this image forming system.

This image forming system curbs the number of printer drivers installed on the server and client PCs, by using the universal printer driver. On the other hand, in case that the image forming system includes a lot of MFPs, a serviceman or an administrator of the image forming system (hereinafter, they may be referred to as administrators) still has to install a lot of printer drivers on the server. Therefore, the administrators have a desire for reduction of man-hours or the like, for maintenance and administration of the printer drivers installed on the server, as much as possible.

FIG. 12 shows a flowchart of set-up works for MFPs, being traditionally performed by an administrator of an image forming system. The flowchart of FIG. 12 shows a case that MFPs are set in a delivery destination, after printer drivers of the MFPs to be set were installed on a server.

Referring to FIG. 12, an administrator installs printer drivers for the MFPs (image forming apparatuses) to be set, on a server (S1101). The administrator urges users of client PCs to download the printer drivers from the server to the client PCs and install them on the client PCs (distributes the printer drivers) (S1102). Next, the administrator determines whether there is still a printer driver to be downloaded to the client PCs or not (S1103).

At step S1103, when there is still a printer driver to be downloaded (YES at S1103), the administrator moves on the task of step S1102.

At step S1103, when there is not a printer driver to be downloaded (NO at S1103), the administrator sets the MFPs at the delivery destination (S1105), and begins to make the MFPs be operated (used) (S1107). Next, the administrator opens (starts up) a UI (User Interface) of the printer driver for the MFP set, among printer drivers being stored in the server (S1109). The administrator configures device option information of the set MFP on the printer driver (S1111), and closes the UI of the printer driver (finishes the startup) (S1113). Next, the administrator determines whether there is still a printer driver to be set up (a printer driver on which device option information is not configured) or not (S1115).

At step S1115, when there is still a printer driver to be set up (YES at S1115), the administrator moves on the task of step S1109. On the other hand, at step S1115, when there is not a printer driver to be set up (NO at S1115), the administrator finishes the set-up task of the MFPs.

As explained with the flowchart of FIG. 12, after the administrator set the MFPs, the administrator should configure device option information on printer drivers stored in the server. The reason is that it is often the case that clients who use MFPs select (buy) device options of the MFP, after the MFP was set.

In case that there are a lot of MFPs to be set, the administrator should configure device option information of the set MFPs, on printer drivers which correspond to the set MFPs. As a result, the administrator's task is troublesome.

One idea of a method to solve this problem is that client PCs automatically acquire device option information from MFPs, for example when the client PCs start up a print setting UI of a printer driver, as substitute for configuring device option information of printer drivers stored in the server by an administrator.

FIG. 13 shows a flowchart of behavior of a traditional client PC, when the traditional client PC automatically acquires device option information from MFPs.

Referring to FIG. 13, when a user starts up a print setting UI of a printer driver, the client PC determines whether an automatic acquisition function for device option information is activated or not (S1201).

At step S1201, when the automatic acquisition function for device option information is activated (YES at S1201), the client PC communicates with the MFP, and acquires device option information (S1203). Next, the client PC starts up (displays) the print setting UI of the printer driver (S1205), and terminates the process.

At step S1201, when the automatic acquisition function for device option information is not activated (NO at S1201), the client PC does not acquire device option information, and steps in the process of step S1205.

According to the above method, each time the user starts up the print setting UI of the printer driver, communication with the MFP is performed. As a result, the network traffic volume increases. In addition, the operability deteriorates, since displaying a print setting UI requires much time.

FIG. 14 shows a flowchart of behavior of a client PC and an administrator, according to a modification of the method in which the client PC automatically acquires device option information from MFPs.

Referring to FIG. 14, as an improvement to the above method and prioritize usability for users, an administrator installs printer drivers on client PCs, and after the client PCs acquired device option information, the administrator should turn off the automatic acquisition function for device option information (step S1301 in FIG. 14). As a result, tasks of the administrator are troublesome.

SUMMARY OF THE INVENTION

Embodiments of the invention provide a printer driver program that can improve convenience.

According to one aspect of this invention, a non-transitory computer-readable recording medium storing a controlling program for a terminal, wherein the controlling program is a printer driver program for the terminal which is configured to communicate with a server and an image forming apparatus, wherein the controlling program causes a computer to execute the steps of: acquire a first time stamp from the server, determine whether the first time stamp and a second time stamp stored in the terminal are identical, acquire information of the image forming apparatus, when the first time stamp and the second time stamp are different, and update content of the second time stamp to content of the first time stamp, when the first time stamp and the second time stamp are different.

According to another aspect of this invention, a non-transitory computer-readable recording medium storing a controlling program for a server, wherein the controlling program is a printer driver program for the server which is configured to communicate with a terminal, wherein the controlling program causes a computer to execute the steps of: receive an instruction to change setting values stored in printer driver programs being installed on the server, change a setting value stored in the printer driver program in accordance with the received instruction, when the instruction was received, search for another printer driver program being installed on the server, in which a setting value is to be changed, when the instruction was received, and change the setting value stored in the another printer driver program, in accordance with the received instruction.

According to another aspect of this invention, a non-transitory computer-readable recording medium storing a controlling program for a server and a terminal, wherein the server and the terminal configures an image forming system with an image forming apparatus, and the controlling program is a printer driver program for the server, and the terminal which is configured to communicate with the server and the image forming apparatus, wherein the controlling program causes a computer to execute the steps of: receive an instruction to change setting values stored in printer driver programs being installed on the server, at the server, change a setting value stored in the printer driver program in accordance with the received instruction, when the instruction was received, at the server, search for another printer driver program being installed on the server, in which a setting value is to be changed, when the instruction was received, at the server, change the setting value stored in the another printer driver program, in accordance with the received instruction, at the server, acquire a first time stamp from the server by the terminal, when the setting value stored in the printer driver programs is a predetermined value, determine whether the first time stamp and a second time stamp stored in the terminal are identical, by the terminal, acquire information of the image forming apparatus by the terminal, when the first time stamp and the second time stamp are different, and update content of the second time stamp to content of the first time stamp by the terminal, when the first time stamp and the second time stamp are different.

According to another aspect of this invention, a terminal comprising a processor, the processor is configured to: acquire a first time stamp from the server, determine whether the first time stamp and a second time stamp stored in the terminal are identical, acquire information of the image forming apparatus, when the first time stamp and the second time stamp are different, and update content of the second time stamp to content of the first time stamp, when the first time stamp and the second time stamp are different.

According to another aspect of this invention, a server comprising a processor, the processor is configured to: receive an instruction to change setting values stored in printer driver programs being installed on the server, change a setting value stored in the printer driver program in accordance with the received instruction, when the instruction was received, search for another printer driver program being installed on the server, in which a setting value is to be changed, when the instruction was received, and change the setting value stored in the another printer driver program, in accordance with the received instruction.

DESCRIPTION OF THE EMBODIMENTS

Embodiments of this invention will be explained based on the Figures in the followings.

In the following embodiments, an image forming apparatus is a MFP, and each of a terminal and a server is a PC. The image forming apparatus may be a printer, a copying machine, a facsimile device, or the like. Each of the terminal and the server may be a smart phone, a tablet, or the like.

Firstly, a structure of the image forming system according to one or more embodiments will be explained.

Figure 1:
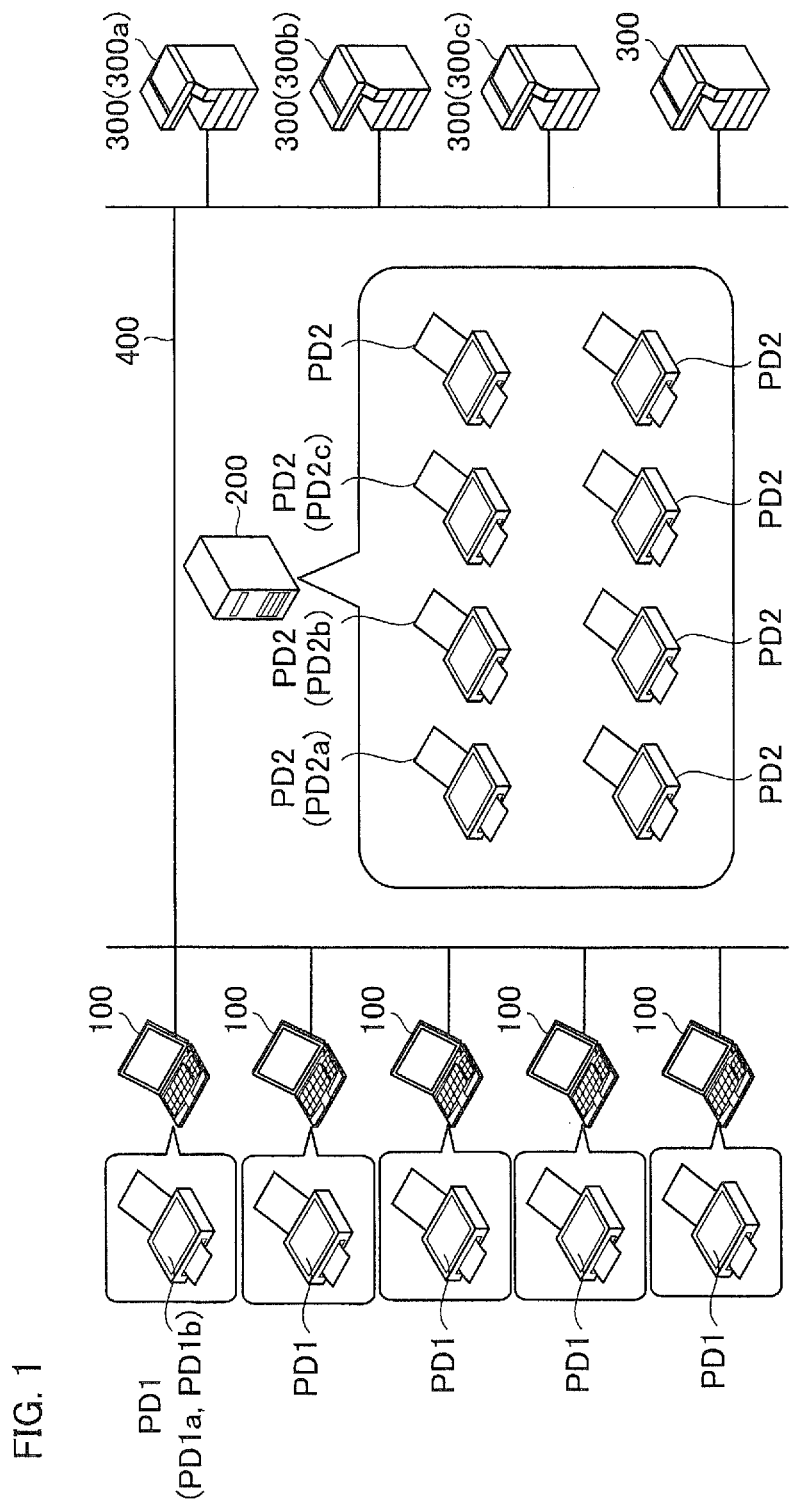
FIG. 1 schematically shows a structure of an image forming system, according to one or more embodiments of the invention.

FIG. 1 schematically shows a structure of an image forming system, according to one or more embodiments of the invention.

Referring to FIG. 1, the image forming system is configured with equipment in a company, for example. The image forming system is equipped with a plurality of client PCs 100 (examples of terminals), server 200, and a plurality of MFPs 300 (examples of image forming apparatuses). The plurality of client PCs 100, server 200, and the plurality of MFPs 300 are connected with each other via network 400, to communicate with each other.

Network 400 is communication lines which use wireless or wired LAN (Local Area Network), for example. Network 400 connects various equipment by using TCP/IP (Transmission Control Protocol/Internet Protocol). Equipment connected to network 400 can transmit/receive various data with each other.

Each of a plurality of printer drivers (printer driver programs) PD2 which corresponds to each of a plurality of MFPs 300 is installed on server 200. More specifically, printer driver PD2a is used when a print job is performed on MFP 300a. Printer driver PD2b is used when a print job is performed on MFP 300b. Printer driver PD2c is used when a print job is performed on MFP 300c.

Each of a plurality of client PCs 100 is possessed by each of a plurality of users. Users download printer driver PD2 which corresponds to MFP 300 having the potential to execute printing, from server 200 to his/her own client PC 100, and install it on the client PC 100. Client PC 100 stores the printer driver downloaded from server 200, as printer driver PD1. For example, client PC 100a stores printer driver PD1a which corresponds to MFP 300a and printer driver PD1b which corresponds to MFP 300b. Each of Printer drivers PD1 and each of printer drivers PD2 are a same module. They will be synchronized at required timing.

Each of printer drivers PD1 and PD2 includes device option information. Device option information shows states of hardware (for example, color printing or the like) and software which can be used on the corresponding MFP. When a print setting UI of printer driver PD1 is displayed on client PC 100, the print setting UI reflects device option information of MFP 300 which corresponds to printer driver PD1.

When device option information of MFP 300 which corresponds to printer driver PD1 is changed (for example, when a new hardware device is added to MFP 300), client PC 100 should update the device option information included in printer driver PD1. When printer driver PD1 is newly installed, client PC 100 should acquire and store the device option information of MFP 300 which corresponds to the new printer driver PD1.

Figure 2:
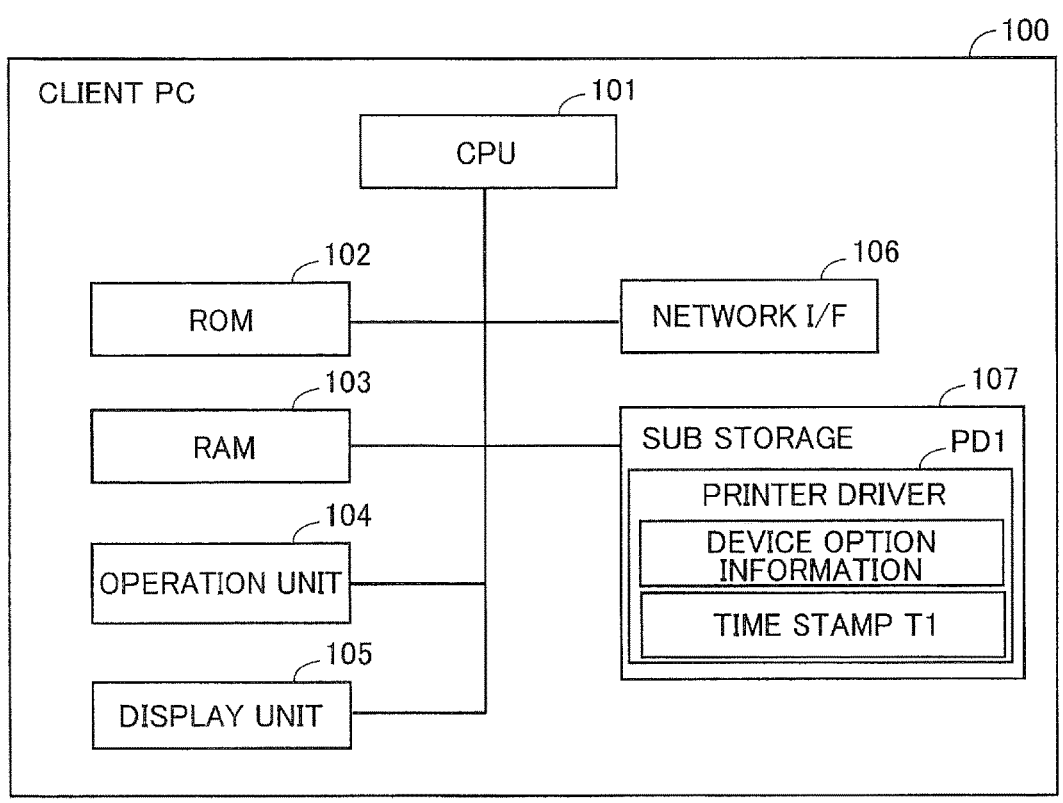
FIG. 2 shows a block diagram of a structure of client PC 100, according to one or more embodiments of the invention.

FIG. 2 shows a block diagram of a structure of client PC 100, according to one or more embodiments of the invention.

Referring to FIG. 2, client PC 100 includes CPU (Central Processing Unit) 101, ROM (Read Only Memory) 102, RAM (Random Access Memory) 103, operation unit 104, display unit 105, network I/F 106, subsidiary storage device 107, and so on. CPU 101, ROM 102, RAM 103, operation unit 104, display unit 105, network I/F 106, and subsidiary storage device 107 are bilaterally connected with each other, via a bus or the like.

CPU 101 controls behavior of entire client PC 100. CPU 101 performs processes based on control programs.

ROM 102 stores control programs or the like which CPU 101 executes.

RAM 103 is a working memory for CPU 101.

Operation unit 104 detects various operations.

Display unit 105 displays various information.

Network I/F 106 transmits and receives various kinds of information with external devices such as server 200 and MFP 300, via network 400.

Subsidiary storage device 107 stores various information such as printer driver PD1. Subsidiary storage device 107 may store a plurality of printer drivers PD1, based on types of MFPs 300. Printer driver PD1 includes device option information, time stamp T1, and so on. Time stamp T1 indicates time and date when client PC 100 acquired the device option information.

Figure 3:
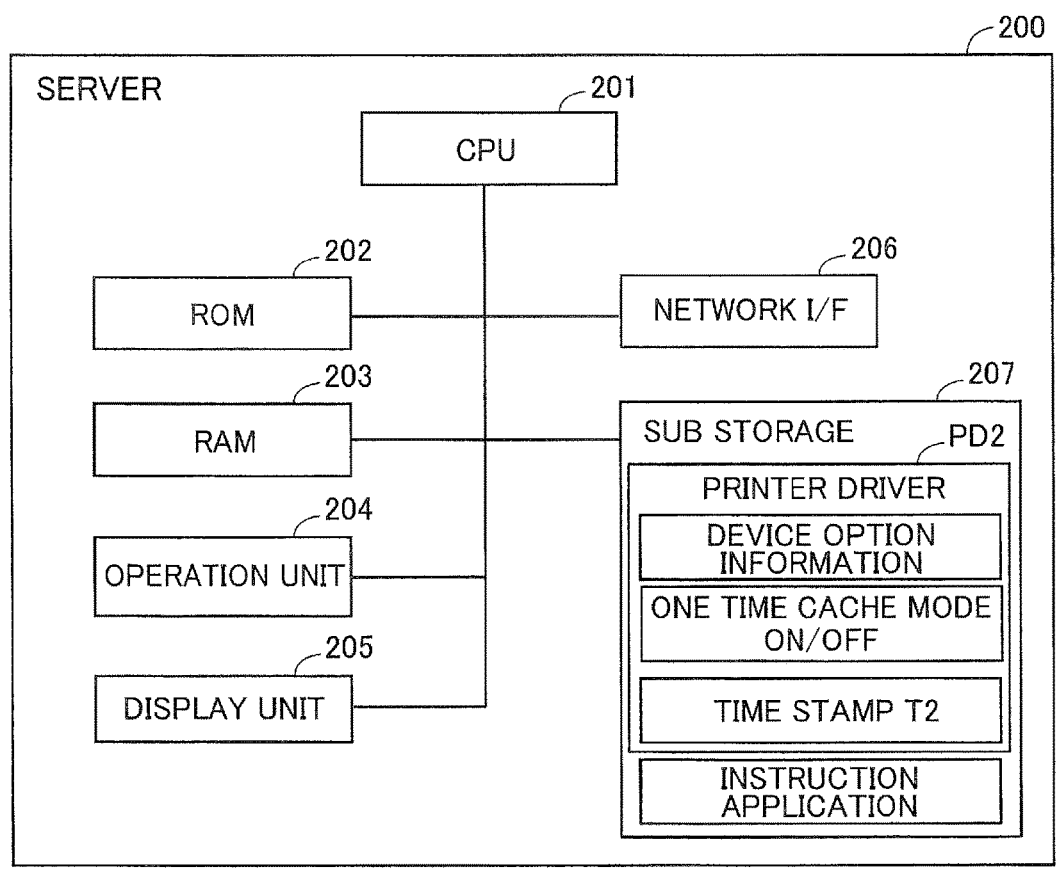
FIG. 3 shows a block diagram of a structure of server 200, according to one or more embodiments of the invention.

FIG. 3 shows a block diagram of a structure of server 200, according to one or more embodiments of the invention.

Referring to FIG. 3, server 200 includes CPU 201, ROM 202, RAM 203, operation unit 204, display unit 205, network I/F 206, subsidiary storage device 207, and so on. CPU 201, ROM 202, RAM 203, operation unit 204, display unit 205, network I/F 206, and subsidiary storage device 207 are bilaterally connected with each other, via a bus or the like.

CPU 201 controls behavior of entire server 200. CPU 201 executes processes based on control programs.

ROM 202 stores control programs or the like, to be executed by CPU 201.

RAM 203 is a working memory for CPU 201.

Operation unit 204 detects various operations.

Display unit 205 displays various information.

Network I/F 206 transmits and receives various kinds of information with external devices such as client PC 100, MFP 300, or the like via network 400.

Subsidiary storage device 207 stores various information of printer driver PD2, the instruction application, and so on. Printer driver PD2 includes the device option information, information related to an ON/OFF setting of a one-time cache mode (an example of a setting value) (hereinafter, it may be referred to as information of a one-time cache mode), time stamp T2, and so on. Subsidiary storage device 207 may store a plurality of printer drivers PD2, based on types of MFPs 300.

The one time cache mode is a function for storing the necessity of acquiring device option information by client PCs 100. Time stamp T2 shows time and date when the one time cache mode was activated (or, time and date when the device option information was updated).

The instruction application is for requesting arbitrary printer driver PD2 which satisfies predetermined conditions (hereinafter, it may be referred to as a main printer driver) to activate information of the one-time cache ON.

Figure 4:
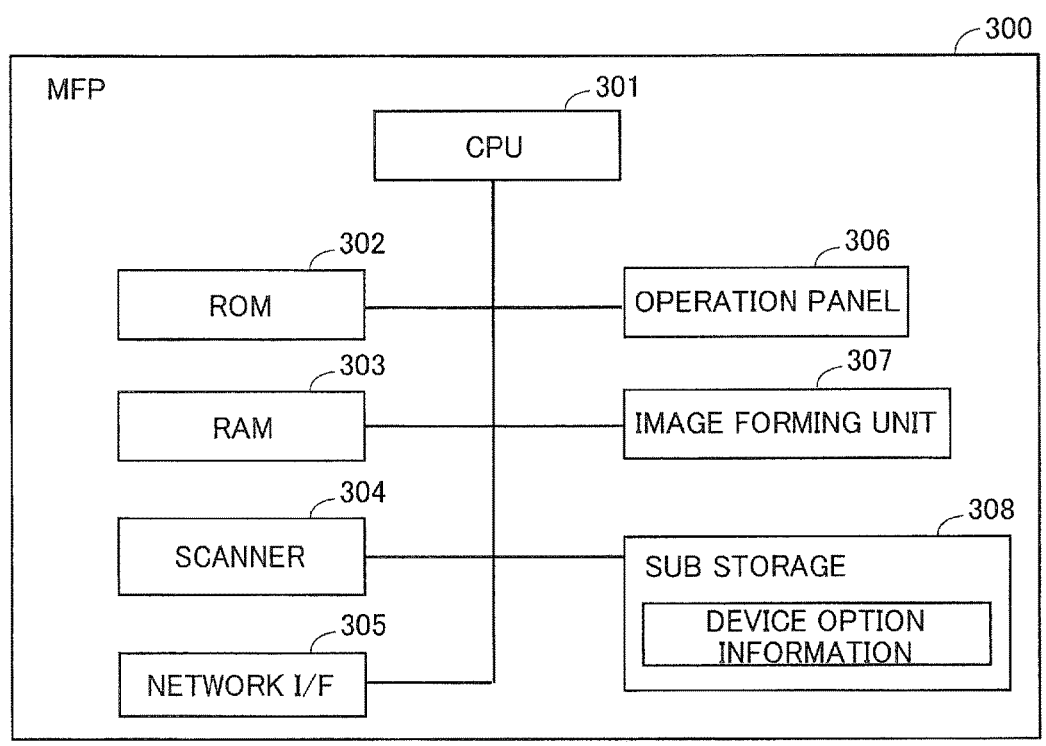
FIG. 4 shows a block diagram of a structure of MFP 300, according to one or more embodiments of the invention.

FIG. 4 shows a block diagram of a structure of MFP 300, according to one or more embodiments of the invention.

Referring to FIG. 4, MFP 300 has a scanner function, a copying function, a function as a printer, a facsimile function, a data transmitting function, and a server function. MFP 300 includes CPU 301, ROM 302, RAM 303, scanner 304, network I/F 305, operation panel 306, image forming unit 307, subsidiary storage device 308, and so on. CPU 301, ROM 302, RAM 303, scanner 304, network I/F 305, operation panel 306, image forming unit 307, and subsidiary storage device 308 are bilaterally connected with each other, via a bus or the like.

CPU 301 controls behavior of entire MFP 300. CPU 301 executes processes based on control programs.

ROM 302 stores control programs or the like to be executed by CPU 301.

RAM 303 is a working memory for CPU 301.

Scanner 304 reads document images and generates image data.

Network I/F 305 transmits and receives various kinds of information with external devices such as client PC 100, server 200, or the like, via network 400.

Operation panel 306 displays various information, and detects various operations.

Image forming unit 307 prints printing data on sheets. Image forming unit 307 is roughly configured with a toner image forming unit, a fixing device, a sheet conveying unit, and so on. Image forming unit 307 forms images on sheets by electrophotographic technology, for example. The toner image forming unit synthesizes 4-color images by a so-called tandem system, and forms color images on sheets (recording media). The toner image forming unit is configured with photo conductors provided for C (cyan), M (magenta), Y (yellow) and K (black), a secondary transfer belt on which toner images are transferred from the photo conductors (the first transfer), a transfer unit for transferring images from the secondary transfer belt to sheets (the second transfer), and so on. The fixing device has a heat roller and a pressure applying roller. The fixing device conveys sheets on which toner images were formed, pinching the sheets by the heat roller and the pressure applying roller, to heat the sheets and apply pressure on the sheets. Herewith, the fixing device melts and fixes toner adhered to the sheets, to form image on the sheets. The sheet conveying unit is configured with paper feeding rollers, conveying rollers, motors for driving the rollers, and so on. The sheet conveying unit feeds sheets from paper feeding cartridges, and conveys them in the inner part of a chassis of MFP 300. The sheet conveying unit discharges sheets on which images were formed, from the chassis of MFP 300 to a copy receiving tray or the like.

Subsidiary storage device 308 stores various information, such as device option information, image data, or the like.

Figure 5:
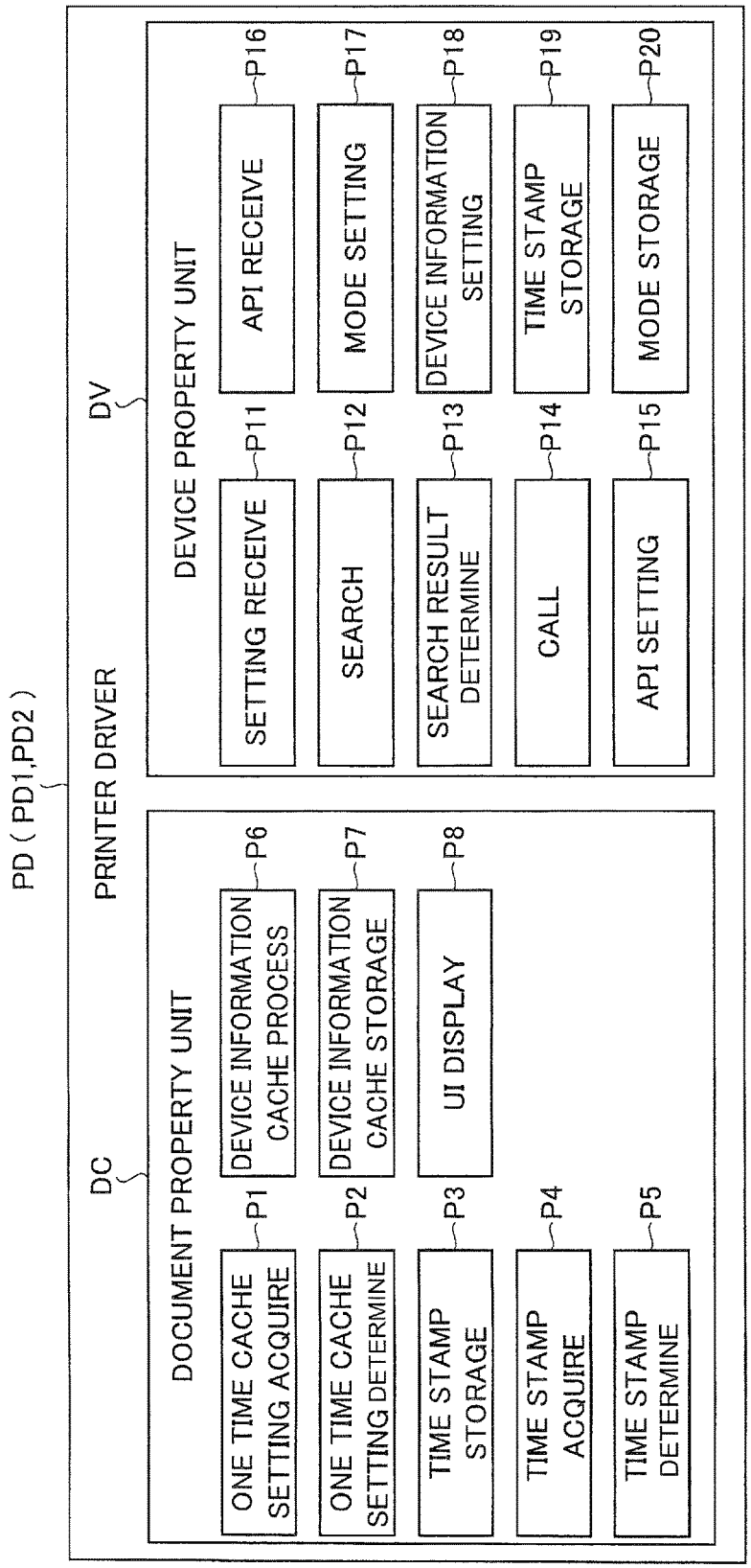
FIG. 5 shows a block diagram of a functional structure of printer driver PD, according to one or more embodiments of the invention.

FIG. 5 shows a block diagram of a functional structure of printer driver PD, according to one or more embodiments of the invention.

Referring to FIG. 5, printer drivers PD1 and PD2 are same, having a configuration structure of Point and Print. Here, each of printer drivers PD1 and PD2 is explained as printer driver PD.

Printer driver PD includes document property unit DC, and device property unit DV. Document property unit DC includes one-time cache setting acquire unit P1, one time cache setting determination unit P2, time stamp storage unit P3, time stamp acquire unit P4, time stamp determination unit P5, device information cache processing unit P6, device information cache storage unit P7, and UI display unit P8.

One time cache setting acquire unit P1 acquires information of the one-time cache from server 200, when required.

One time cache setting determination unit P2 determines whether the acquired information of the one-time cache is ON or not.

Time stamp storage unit P3 stores time stamp T1.

Time stamp acquire unit P4 acquires time stamp T2 from server 200, under certain circumstances.

Time stamp determination unit P5 determines whether time stamp T2 acquired by time stamp acquire unit P4 is the same as time stamp T1 stored in time stamp storage unit P3 or not.

Device information cache processing unit P6 acquires device option information from MFP 300 when required, and stores the acquired device option information in device information cache storage unit P7.

Device information cache storage unit P7 stores the device option information.

UI display unit P8 displays a print setting UI on display unit 105 of client PC 100, and receives various settings via the print setting UI.

Device property unit DV includes setting receiving unit P11, search unit P12, search result determination unit P13, call unit P14, API (Application Program Interface) setting unit P15, API receiving unit P16, mode setting unit P17, device information setting unit P18, time stamp storage unit P19, and mode storage unit P20.

Setting receiving unit P11 receives a request for activating the one time cache mode from the instruction application.

Search unit P12 searches other printer drivers PD2 stored in server 200, when a request for activating the one time cache mode from the instruction application is received.

Search result determination unit P13 determines whether printer driver PD2 for which searched by driver search unit P12 satisfies predetermined search conditions or not.

Call unit P14 calls printer driver PD2 which satisfies the predetermined search conditions.

API setting unit P15 requests the called printer driver PD2 to activate the one time cache mode (sets the one time cache mode ON, for the called printer driver PD2).

API receiving unit P16 receives a request for activating information of the one-time cache ON, from the main printer driver.

Mode setting unit P17 activates its own one time cache mode ON, in response to a request from an instruction application or the main printer driver.

Device information setting unit P18 sets device option information of corresponding MFP 300, to printer driver PD1.

Time stamp storage unit P19 stores time stamp T2.

Mode storage unit P20 stores the setting content (ON or OFF) of the one-time cache mode.

Printer driver PD is equipped with a driver API for communication with instruction applications.

Figure 6:
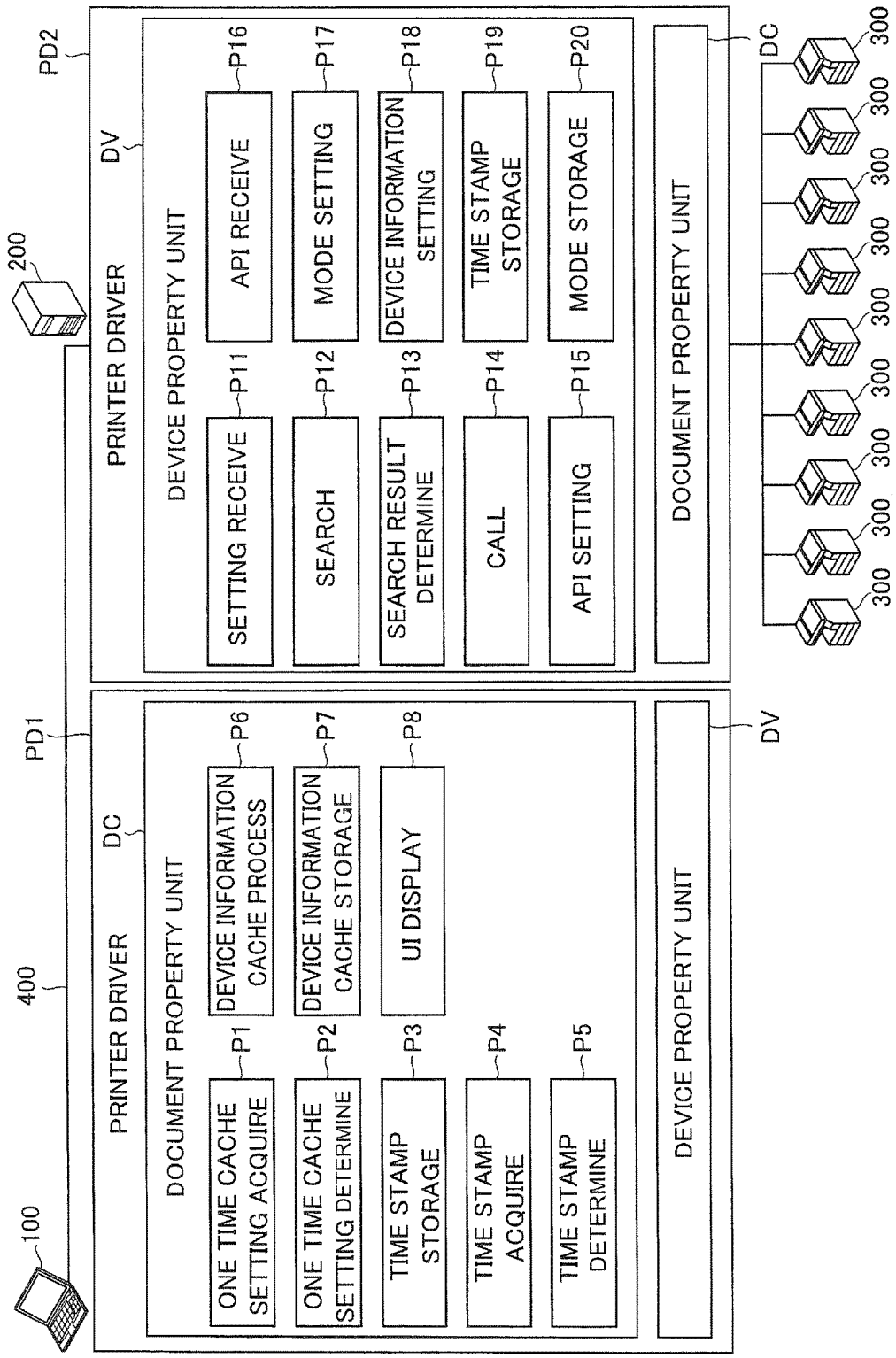
FIG. 6 shows functional structures of printer drivers PD1 and PD2 stored in both PC 100 and server 200, according to one or more embodiments of the invention.

FIG. 6 shows functional structures of printer drivers PD1 and PD2 stored in PC 100 and server 200, according to one or more embodiments of the invention.

Referring to FIG. 6, each of client PC 100 and server 200 has each of printer drivers PD1 and PD2. Document property unit DC is a part which runs on client PC 100 (a part which is used by client PC 100). Printer driver PD1 installed on client PC 100 includes device property unit DV. However, the device property unit DV is not used on client PC 100.

Device property unit DV is a part which runs on server 200 (a part which is used by server 200). Printer driver PD2 installed on server 200 includes document property unit DC. However, the document property unit DC is not used on server 200.

Next, the behavior of the image forming system according to one or more embodiments will be explained.

Figure 7:
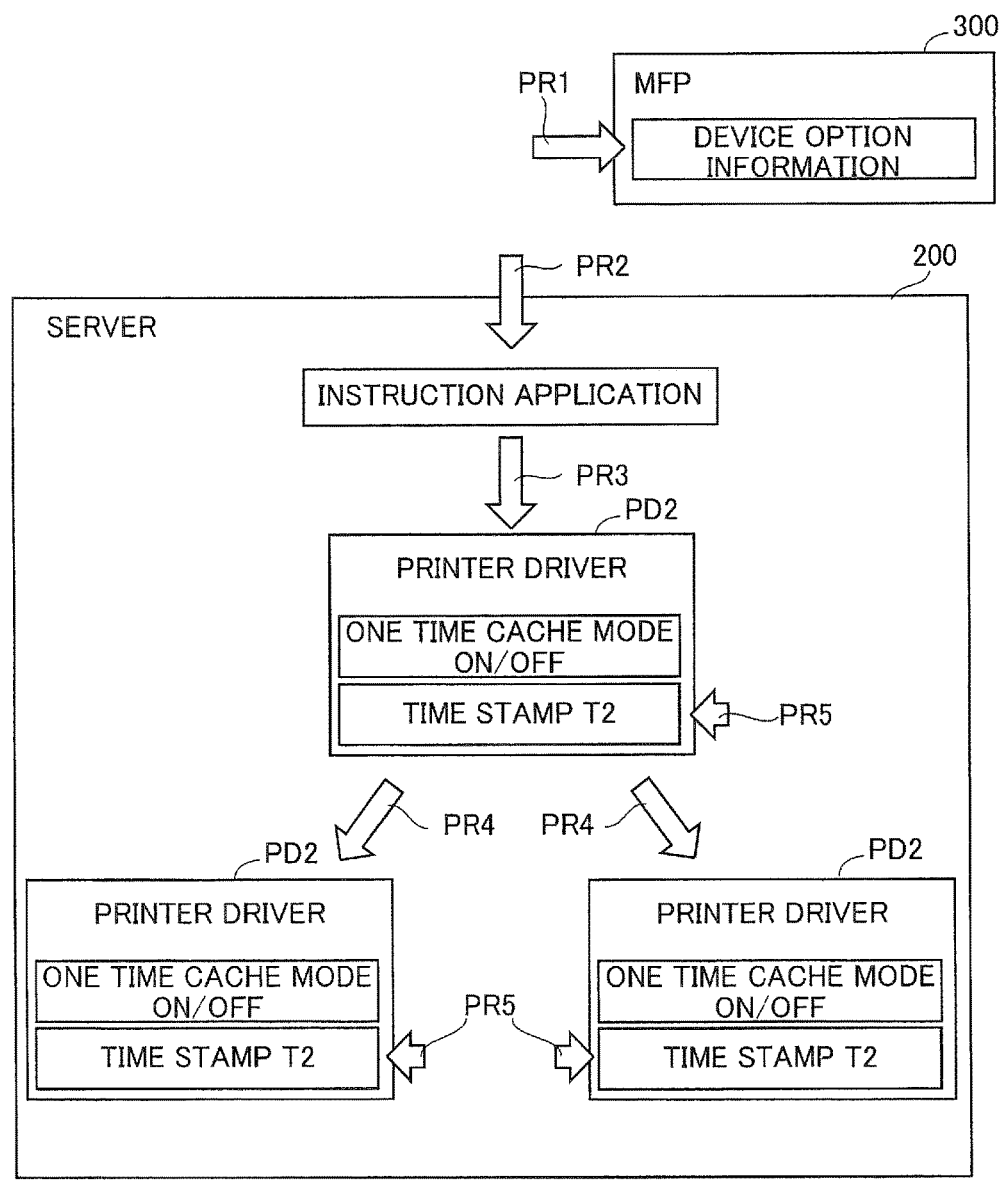
FIG. 7 is the first figure showing behavior of the image forming system, according to one or more embodiments of the invention.
Figure 8:
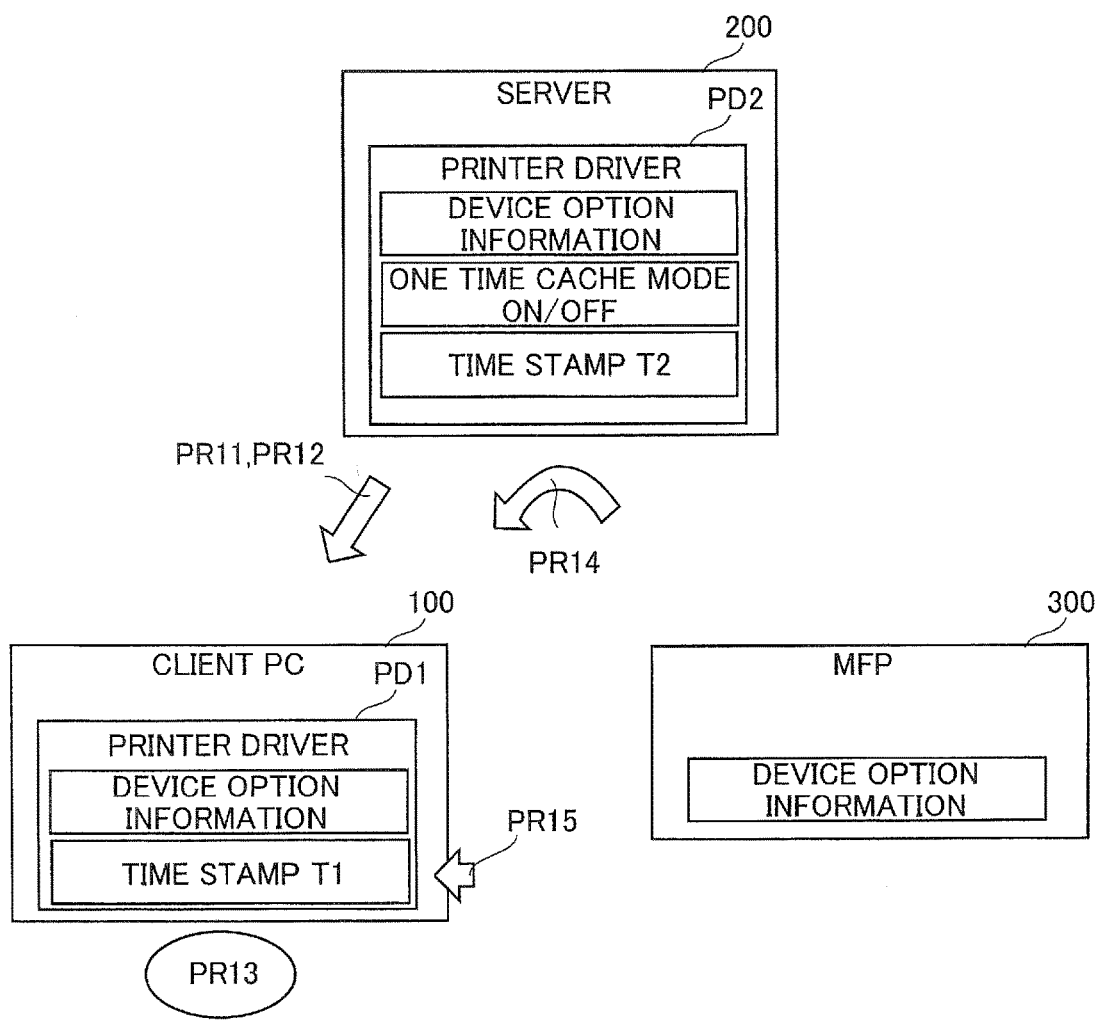
FIG. 8 is the second figure showing behavior of the image forming system, according to one or more embodiments of the invention.

FIGS. 7 and 8 show behavior of the image forming system, according to one or more embodiments of the invention.

Referring to FIG. 7, an administrator makes subsidiary storage device 308 of MFP 300 store new device options of MFP 300, when a new MFP 300 is added to the image forming system or device options of MFP 300 are changed (process PR1).

Next, the administrator starts up an instruction application in server 200. The administrator operates the instruction application to make the instruction application execute processes (the driver API program) for activating a one-time cache mode of printer driver PD2 ON (process PR2).

When the instruction application receives the operation from the administrator, the instruction application requests an arbitrary printer driver PD2 (the main printer driver) which satisfies the predetermined search conditions to activate (change) the one time cache mode ON (process PR3).

When the main printer driver receives the request from the instruction application, the main printer driver activates its own one time cache mode ON. Further, the main printer driver requests other printer drivers PD2 which satisfy predetermined search conditions (other printer drivers PD2 in which the setting value is to be changed), among other printer drivers PD2 installed in server 200, to activate the one time cache mode ON (process PR4). The other printer drivers PD2 activate information of its own one time cache mode ON, in response to the request.

The above predetermined search conditions are that a driver API is equipped with, and ON/OFF of a one-time cache mode is settable, for example.

Each of printer drivers PD2 stores time and date when the one time cache mode is turned ON, as time stamp T2 (process PR5).

Referring to FIG. 8, printer driver PD1 of client PC 100 acquires information of the one-time cache mode of corresponding printer driver PD2, at the timing of starting up of print setting UI of printer driver PD1, for example (process PR11).

When the acquired information of the one-time cache mode is ON, it indicates that the device option information of MFP 300 that constitutes the image forming system was changed, or a new MFP 300 was added. In this instance, printer driver PD1 acquires time stamp T2 from printer driver PD2 (process PR12), and determines whether its own time stamp T1 being stored in printer driver PD1 is the same as the acquired time stamp T2 or not (process PR13).

When the acquired information of the one-time cache mode is OFF, it indicates that the device option information of MFP 300 that constitutes the image forming system was not changed, and a new MFP 300 was not added. In this instance, printer driver PD1 does not update its own device option information being stored in printer driver PD1, and displays the print setting UI which reflects its own device option information being stored in printer driver PD1.

When time stamp T1 and time stamp T2 are different, printer driver PD1 stores device option information before the update, even though the device option information of MFP 300 was updated. In this instance, printer driver PD1 acquires new device option information from MFP 300, and updates its own stored device option information (process PR14).

Printer driver PD1 acquires the new device option information from MFP 300 via server 200. Herewith, the device option information of printer driver PD2 stored in server 200 can be also updated at the same timing. Printer driver PD1 may directly acquire the new device option information from MFP 300.

When printer driver PD1 does not memorize (store) time stamp T1, it indicates that the corresponding MFP 300 was newly installed. In this instance, printer driver PD1 acquires the new device option information from MFP 300, and stores the new device option information as its own device option information (process PR14).

When printer driver PD1 acquires the new device option information from MFP 300, printer driver PD1 updates the content of time stamp T1 to the content of time stamp T2 acquired (process PR15).

When time stamp T1 and time stamp T2 are same, printer driver PD1 already has the newest device option information. In this instance, printer driver PD1 does not update its own stored device option information, and displays the print setting UI (the setting screen) which reflects its own stored device option information. The print setting UI is a setting screen for printing to be performed on MFP 300.

Figure 9:
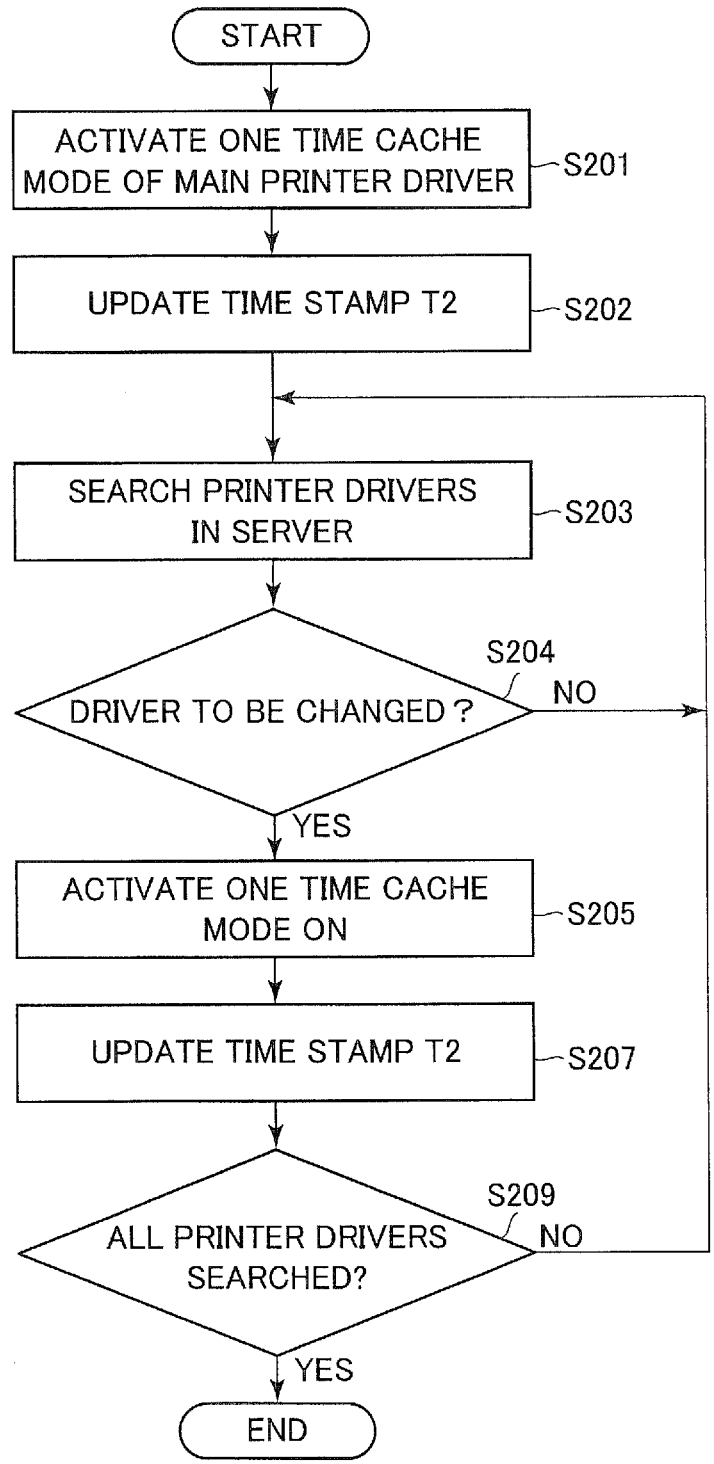
FIG. 9 shows a flowchart of processes executed by server 200, when server 200 received a request for activating a one-time cache mode from an instruction application, according to one or more embodiments of the invention.

FIG. 9 shows a flowchart of processes executed by server 200, when server 200 received a request for activating a one-time cache mode from an instruction application, according to one or more embodiments of the invention.

Referring to FIG. 9, when CPU 201 receives a request for activating the one time cache mode from the instruction application, CPU 201 turns the one time cache mode of the main printer driver ON (S201), and updates time stamp T2 stored in the main printer driver (S202). Next, CPU 201 searches for printer driver PD2 in server 200 (S203), and determines whether the found printer driver PD2 satisfies the predetermined search conditions or not (determines whether the found printer driver PD2 is a printer driver to be changed or not) (S204).

At step S204, when the found printer driver PD2 does not satisfy the predetermined search conditions (NO at S204), CPU 201 steps in the process of step S203.

At step S204, when the found printer driver PD2 satisfies the predetermined search conditions (YES at S204), CPU 201 turns the one time cache mode of the found printer driver PD2 ON (S205), and updates time stamp T2 stored in the found printer driver PD2 (S207). Next, CPU 201 determines whether all the printer drivers PD2 in server 200 were searched for (S209).

At step S209, when all the printer drivers PD2 in server 200 were not searched for (NO at S209), CPU 201 steps in the process of step S203.

At step S209, when all the printer drivers PD2 in server 200 were searched for (YES at S209), CPU 201 terminates the process.

Figure 10:
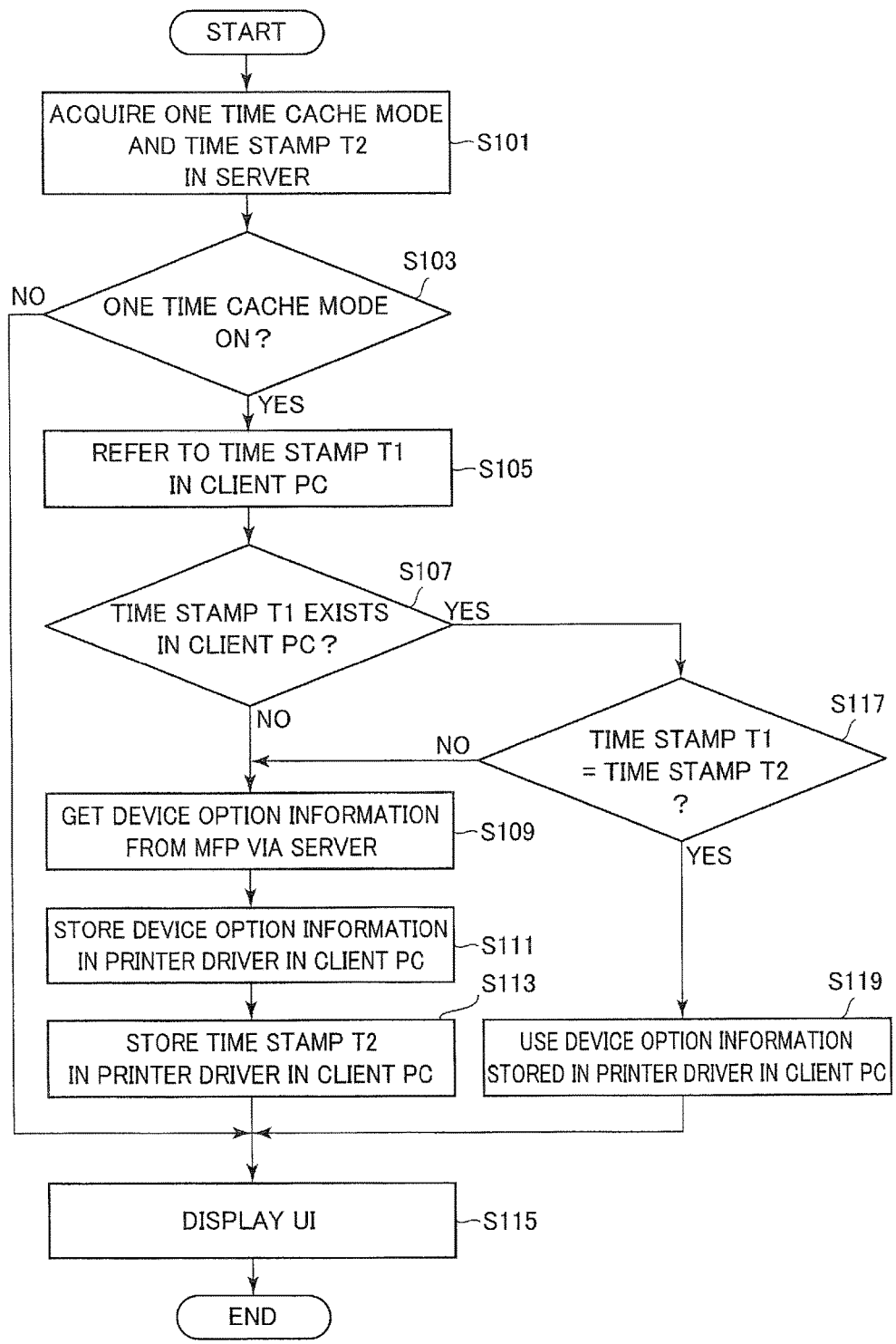
FIG. 10 shows a flowchart of processes executed by client PC 100, when print setting UI of printer driver PD1 is started up on client PC 100, according to one or more embodiments of the invention.

FIG. 10 shows a flowchart of processes executed by client PC 100, when the print setting UI of printer driver PD1 is started up on client PC 100, according to one or more embodiments of the invention.

Referring to FIG. 10, CPU 101 acquires the information of the one-time cache mode and time stamp T2 from corresponding printer driver PD2 in server 200 (S101), and determines whether the acquired one time cache mode is ON or not (S103).

At step S103, when the acquired information of the one-time cache mode is not ON (NO at S103), CPU 101 steps in the process of step S115.

At step S103, when the acquired information of the one-time cache mode is ON (YES at S103), CPU 101 refers to time stamp T1 of printer driver PD1 (S105), and determines whether time stamp T1 is stored or not (S107).

At step S107, when time stamp T1 is stored (YES at S107), CPU 101 determines whether time stamp T1 stored in printer driver PD1 and the acquired time stamp T2 are same or not (S117).

At step S117, when time stamp T1 and time stamp T2 are same (YES at S117), CPU 101 uses the device option information stored in printer driver PD1 (S119), and steps in the process of step S115.

When time stamp T1 is not stored (NO at S107), or when time stamp T1 and time stamp T2 are not same (NO at S117), CPU 101 acquires the device option information from MFP 300 via server 200 (S109), and stores the device option information in printer driver PD1 (S111). Next, CPU 101 stores the content of time stamp T2 in printer driver PD1 (S113), and steps in the process of step S115.

At step S115, CPU 101 displays the print setting UI reflecting the device option information (S115), and terminates the process.

[The Effect of Select Embodiments]

Figure 11:
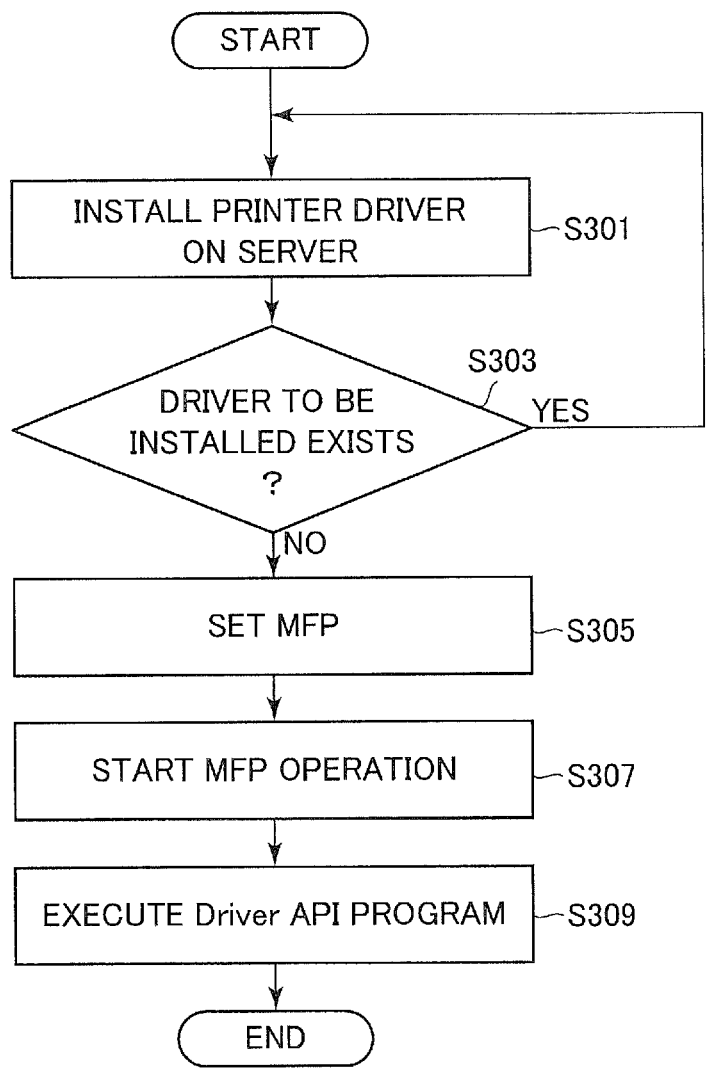
FIG. 11 shows a flowchart of set-up works for MFP 300 which an administrator of an image forming system performs, according to one or more embodiments of the invention.
Figure 12:
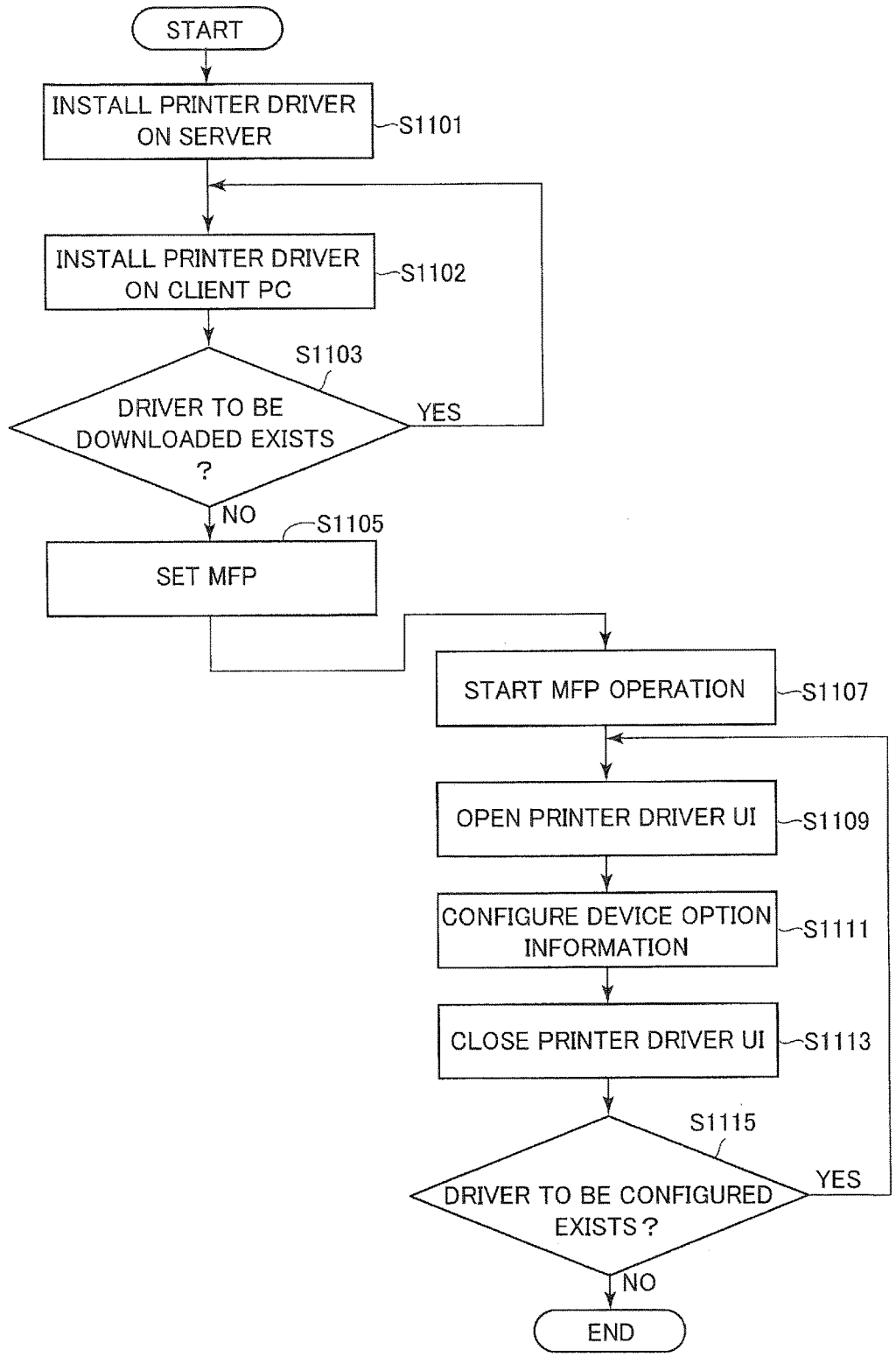
FIG. 12 shows a flowchart of set-up works for MFPs, being traditionally performed by an administrator of an image forming system.
Figure 13:
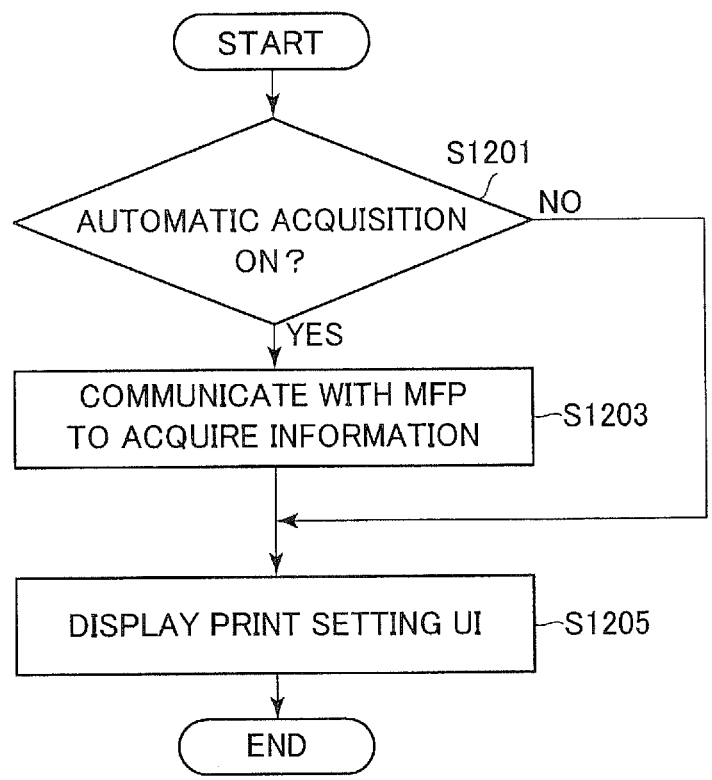
FIG. 13 shows a flowchart of behavior of a traditional client PC, when the traditional client PC automatically acquires device option information from MFPs.
Figure 14:
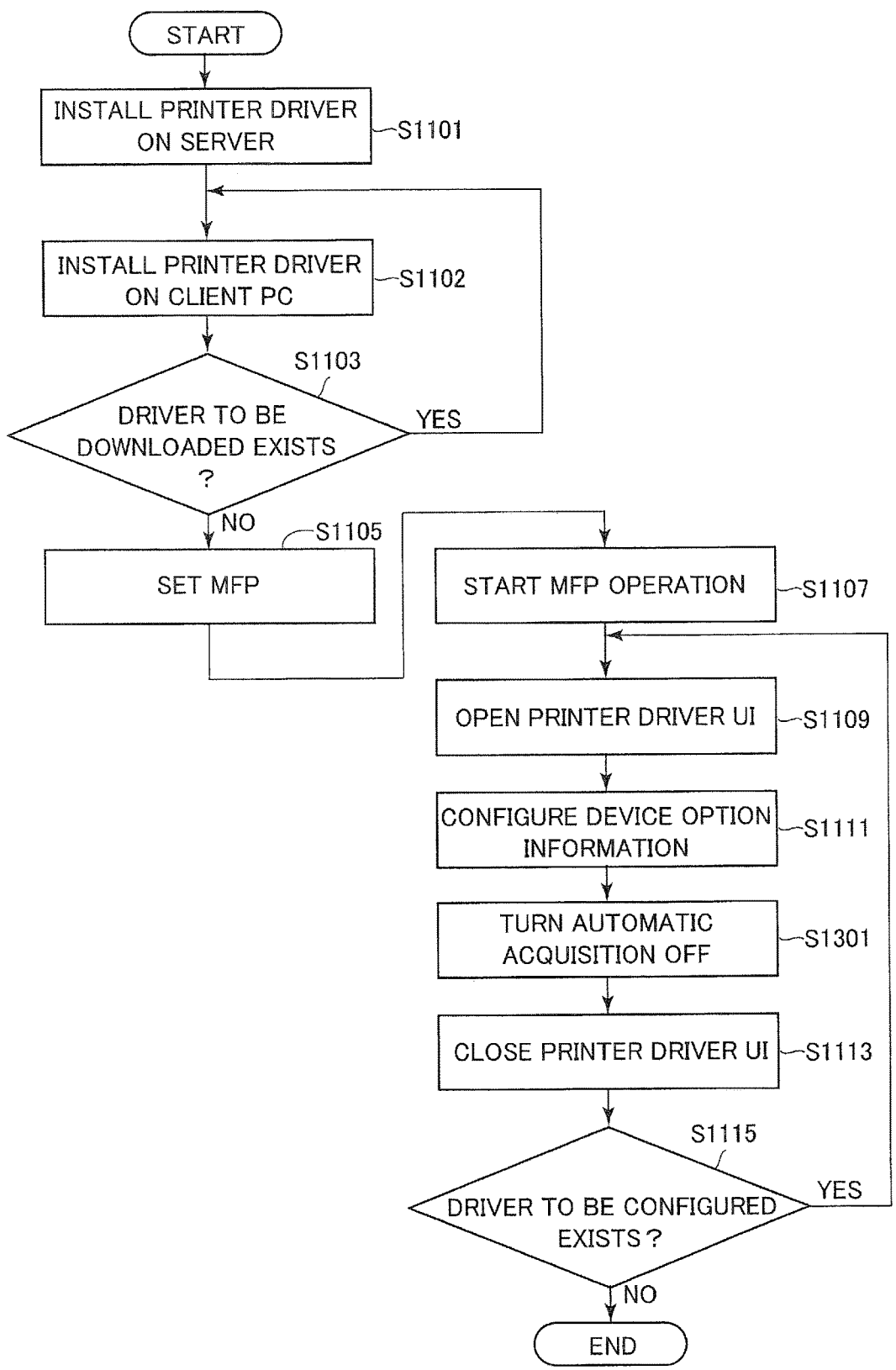
FIG. 14 shows a flowchart of behavior of a client PC and an administrator, according to a modification of the traditional method in which a client PC automatically acquires device option information from MFPs.

FIG. 11 shows a flowchart of set-up works for MFP 300 which an administrator of an image forming system performs, according to one or more embodiments of the invention.

Referring to FIG. 11, an administrator installs printer driver PD2 of MFP 300 to be set, on server 200 (S301), and determines whether there is still a printer driver PD1 to be installed on server 200 or not (S303).

At step S303, when there is a printer driver PD1 to be installed on server 200 (YES at S303), the administrator moves on the task of step S301.

At step S303, when there is not a printer driver to be installed (NO at S303), the administrator sets the MFP at the delivery destination (S305), and begins to make the MFP operated (used) (S307). Next, the administrator starts up the instruction application, makes the instruction application execute processes (the driver API program) for activating the one time cache mode of printer driver PD2 ON (S309), and terminates the process.

According to one or more embodiments, an administrator can turn the one time cache mode ON for all the necessary printer drivers in a server, by operating the instruction application installed in the server. Further, the administrator can automatically urge client PCs to update the device option information. When device option information of MFPs in an image forming system is changed, or when a new MFP is added, the device option information of the printer driver should be set. According to one or more embodiments, an administrator's work load of setting the device option information of printer drivers can be drastically lightened. In addition, client PCs do not need to communicate with MFPs to confirm the presence or absence of update of device option information. Hence, operability of printer drivers at client PC side can be improved. As a result, convenience of printer driver programs can be improved.

[Others]

MFP 300 may play a role as server 200.

When time stamp T1 and time stamp T2 are different, information acquired by printer driver PD1 is not limited to device option information. Printer driver PD1 may acquire information of MFP 300 which corresponds to printer driver PD1.

A one-time cache mode stored in printer driver PD2 may be set as ON at all times. Printer driver PD2 may not store ON/OFF settings of the one-time cache mode. In this instance, printer driver PD1 at client PC 100 side may acquire time stamp T2 at required timing.

The processes of one or more embodiments may be performed by software or a hardware circuit. A computer program which executes the processes in one or more embodiments can be provided. The program may be provided recorded in recording media of CD-ROMs, flexible disks, hard disks, ROMs, RAMs, memory cards, or the like to users. The program is executed by a computer of a CPU or the like. The program may be downloaded to a device via communication lines like the internet. The processes explained in the above flowcharts and the description are executed by a CPU in line with the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A non-transitory computer-readable recording medium storing a controlling program for a terminal, wherein the controlling program is a printer driver program for the terminal that communicates with a server and an image forming apparatus, and wherein the controlling program causes a computer to:

acquire a first time stamp from the server, determine whether the first time stamp and a second time stamp stored in the ten final are identical, acquire information of the image forming apparatus when the first time stamp and the second time stamp are different, and update content of the second time stamp to content of the first time stamp when the first time stamp and the second time stamp are different.

2. The non-transitory computer-readable recording medium storing the controlling program for the terminal according to claim 1, wherein the controlling program further causes the computer to:

not acquire the information of the image forming apparatus from the image forming apparatus when the first time stamp and the second time stamp are same.

3. The non-transitory computer-readable recording medium storing the controlling program for the terminal according to claim 1, wherein the controlling program further causes the computer to:

acquire the information of the image forming apparatus from the image forming apparatus when the terminal does not store the second time stamp.

4. The non-transitory computer-readable recording medium storing the controlling program for the terminal according to claim 1, wherein the controlling program further causes the computer to:
   store the acquired information of the image forming apparatus, and
   display, on the terminal, a setting screen for printing to be executed by the image forming apparatus, wherein the setting screen reflects the stored information of the image forming apparatus.

5. A non-transitory computer-readable recording medium storing a controlling program for a server, wherein the controlling program is a printer driver program for the server that communicates with a terminal, wherein the controlling program causes a computer to:
   receive an instruction to change setting values stored in a printer driver program being installed on the server,
   change a setting value stored in the printer driver program in accordance with the received instruction, when the instruction was received,
   update a time stamp stored in the printer driver to reflect a time and date when the setting value stored in the printer driver program is changed,
   search for another printer driver program being installed on the server, in which a setting value is to be changed, when the instruction was received,
   change the setting value stored in the another printer driver program, in accordance with the received instruction, and
   update a time stamp stored in the another printer driver to reflect the time and date when the setting value stored in the another printer driver program is changed.

6. A non-transitory computer-readable recording medium storing a controlling program for a server and a terminal, wherein the server and the terminal configures an image forming system with an image forming apparatus, the controlling program is a printer driver program for the server, and the terminal communicates with the server and the image forming apparatus, wherein the controlling program causes a computer to:
   receive an instruction to change setting values stored in printer driver programs being installed on the server, at the server,
   change a setting value stored in the printer driver program in accordance with the received instruction when the instruction was received, at the server,
   search for another printer driver program being installed on the server, in which a setting value is to be changed, when the instruction was received, at the server,
   change the setting value stored in the another printer driver program, in accordance with the received instruction, at the server,
   acquire a first time stamp from the server by the terminal when the setting value stored in the printer driver programs is a predetermined value,
   determine whether the first time stamp and a second time stamp stored in the terminal are identical, by the terminal,
   acquire information of the image forming apparatus by the terminal, when the first time stamp and the second time stamp are different, and
   update content of the second time stamp to content of the first time stamp by the terminal, when the first time stamp and the second time stamp are different.

7. A terminal comprising a processor that:
   acquires a first time stamp from the server,
   determines whether the first time stamp and a second time stamp stored in the terminal are identical,
   acquires information of the image forming apparatus, when the first time stamp and the second time stamp are different, and
   updates content of the second time stamp to content of the first time stamp, when the first time stamp and the second time stamp are different.

8. The terminal according to claim 7, wherein
   the processor does not acquire the information of the image forming apparatus from the image forming apparatus, when the first time stamp and the second time stamp are same.

9. The terminal according to claim 7, wherein the processor further:
   acquires the information of the image forming apparatus from the image forming apparatus, when the terminal does not store the second time stamp.

10. The terminal according to claim 7, wherein the processor further:
    stores the acquired information of the image forming apparatus, and
    displays on the terminal, a setting screen for printing to be executed by the image forming apparatus, wherein the setting screen reflects the stored information of the image forming apparatus.

11. A server comprising a processor that:
    receives an instruction to change setting values stored in a printer driver program being installed on the server,
    changes a setting value stored in the printer driver program in accordance with the received instruction when the instruction was received,
    updates a time stamp stored in the printer driver to reflect a time and date when the setting value stored in the printer driver program is changed,
    searches for another printer driver program being installed on the server, in which a setting value is to be changed when the instruction was received,
    changes the setting value stored in the another printer driver program, in accordance with the received instruction, and
    updates a time stamp stored in the another printer driver to reflect the time and date when the setting value stored in the another printer driver program is changed.

* * * * *